United States Patent
Nishimura

(10) Patent No.: US 6,608,416 B2
(45) Date of Patent: Aug. 19, 2003

(54) MOTOR AND METHOD OF MANUFACTURING THE SAME

(75) Inventor: Kiyoshi Nishimura, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 10/166,630

(22) Filed: Jun. 12, 2002

(65) Prior Publication Data

US 2002/0190591 A1 Dec. 19, 2002

(30) Foreign Application Priority Data

Jun. 13, 2001 (JP) .................................. P2001-178404

(51) Int. Cl.[7] .............................................. H02K 7/08
(52) U.S. Cl. .................. 310/90; 310/49 R; 310/89; 310/91; 29/596; 29/598
(58) Field of Search ................... 310/90, 89, 91, 310/49 R, 254; 29/596, 598

(56) References Cited

U.S. PATENT DOCUMENTS 5,264,747 A * 11/1993 Kawamura ............ 310/49 R
5,886,438 A * 3/1999 Kawanishi ............... 310/90
6,255,749 B1 * 7/2001 Aoshima et al. ......... 310/49 R
2002/0047383 A1 * 4/2002 Mayumi .................. 310/89
2002/0084709 A1 * 7/2002 Yajima et al. ............ 310/90

* cited by examiner

Primary Examiner—Thanh Lam
(74) Attorney, Agent, or Firm—Sughrue Mion, PLLC

(57) ABSTRACT

A motor includes a cylindrical rotor having a magnet, a stator having a cylindrical inner peripheral surface opposing to an outer periphery of the rotor, an output shaft projecting from one axial end side of the stator, and a frame fixed to the one axial end side of the stator to pivotally support the output shaft at a distal end thereof. Holes having diameters identical to the inner diameter of the stator are formed in the frame for pivotally supporting the distal end of the output shaft and for fixing the stator. A positioning jig of a diameter slightly smaller than those of the holes are simultaneously inserted into a hole defining the inner peripheral surface of the stator and into the two holes in the frame, and the positioning jig are caused to abut against the inner peripheral surfaces of the holes to effect positioning.

5 Claims, 4 Drawing Sheets

MOTOR AND METHOD OF MANUFACTURING THE SAME

The present application is based on Japanese Patent Application No. 2001-178404, the entire contents of which are incorporated herein by reference.

BACKGROUND OF THE INVENTION

The present invention relates to a relatively small-sized motor, such as a motor for feeding an optical pickup in an optical disk drive apparatus or the like, and a method of manufacturing the same, and more particularly to a technique for improve the accuracy of such a motor.

In many cases, high dimensional accuracy and rotational accuracy are required for small-sized motors depending on their applications. For instance, in a motor for feeding an optical pickup in an optical disk drive apparatus or the like, there is a need to move the optical pickup smoothly, and it is required that the stopping position accuracy is to be high. Referring now to FIG. 4, a description will be given of an example of a conventional motor of this type.

In FIG. 4, a stator portion of the motor includes a stator set consisting of a stator core 1 and drive coils 3 each wound around a bobbin 13 circumscribing this stator core 1 as well as a stator set consisting of a stator core 2 and drive coils 4 each wound around a bobbin 19 circumscribing this stator core 2. These two stator sets are fixed by being superposed in the axial direction. This motor is a stepping motor, and each of the stator cores 1 and 2 has a plurality of pole teeth arranged at equal intervals in a cylindrical shape on its inner peripheral side. An outer side surface of a bent side 10a at one end side of a frame 10, which is formed in a U-shape with both end faces bent orthogonally in the same direction and with a long bottom, is fixed to an end face on an axially outer side of the stator core 1.

A hole with a diameter of φB is formed in a bent side 10b at the other end side of the frame 10, and a bearing 11, which consists of an outside-diameter portion having the same diameter as the aforementioned φB and an outside-diameter portion larger than the same, has its outside diameter φB portion fitted and fixed in this hole from the inner side of the frame 10. The bearing 11 has a recess for receiving one end portion of an output shaft 6, and has a semispherical recess for receiving an approximately half of a steel ball 12 in a bottom of this recess. A conical recess provided at a distal end of the output shaft 6 is fitted over the steel ball 12 fitted in the semispherical recess.

The bent side 10a at the one end side of the frame 10 is also provided with a hole with substantially the same diameter φD as the aforementioned diameter φB, and the output shaft 6 is passed through this hole. One end side of the output shaft 6 is formed as a small-diameter portion 6a, and this small-diameter portion 6a is inserted in holes defining inner peripheral sides of the stator cores 1 and 2. The inside diameter φC of the stator cores 1 and 2 is larger than the diameters φB and φD of the holes formed in the bent sides 10a and 10b of the frame 10. A slide bearing 8 whose outside diameter is substantially the same as the aforementioned inside diameter φC is fitted on an inner periphery of a bearing member fixed to an end face of the stator core 2 having the inside diameter φC, such that the slide bearing 8 is slidable along the inner periphery of the bearing member.

The slide bearing 8 has a recess on its inner end side, and an approximately half portion of a steel ball 7 is thrust into this recess, while the remaining approximately half portion of the steel ball 7 is fitted in a conical recess formed in an end face of the small-diameter portion 6a which is the one end side of the output shaft 6. The slide bearing 8 has its proximal portion urged in a direction in which it enters an inner periphery of the stator core 2 by a leaf spring 9 fixed to an outer end of the stator core 2. The steel ball 7 presses the output shaft 6 by this urging force to cause the steel ball 12 at the distal end of the output shaft 6 to be pressed against the bearing 11. Thus the output shaft 6 is rotatably supported by the bearings 8 and 11 via the steel balls 7 and 12, and the load in the direction of thrust is thereby received. A hollow cylindrical magnet 5 is fitted and secured on an outer peripheral side of the small-diameter portion 6a of the output shaft 6, and the output shaft 6 and the magnet 5 constitute the rotor of the motor.

Magnetic poles are formed in the magnet 5 at equal intervals in the circumferential direction, and as the drive coils 3 and 4 are alternately energized by a power supply in the form of pulses, the rotor rotates through predetermined angles. A lead screw is formed on the output shaft 6 between the bent sides 10a and 10b of the frame 10, and as a portion of an object to be driven, such as an unillustrated optical pickup, or a member substantially integrated therewith, is engaged with this lead screw, the object to be driven is moved back and forth along the output shaft 6 in correspondence with the rotation of the output shaft 6.

The above-described motor is a compact motor with an outside diameter of 6 mm or less in the case of driving an optical pickup, or one with a width of 6 mm or thereabouts in the case of an oval motor. With such a small-sized motor, since there is a need to make smaller the air gap between the inner periphery of the stator and the outer periphery of the rotor magnet 5, high accuracy of concentricity is required for respective component units. However, a further increase in the accuracy of individual components involves higher cost, which is undesirable since a highly sophisticated production technique is required.

In addition, to obtain concentricity for the main body portion of the motor and the output shaft 6, during assembly a pin gage is inserted through a hole defining an inner periphery of the main body portion of the motor and the holes formed in the bent sides 10a and 10b of the frame 10, and the main body of the motor and the frame 10 are fixed in a state in which the relative positional offset, inclination, and a deviation in concentricity are eliminated. However, since the inside diameter of the main body portion and the diameter of the holes formed in the bent sides 10a and 10b of the frame 10 differ, as described above, a pin gage having a step needs to be used correspondingly. As such, however, if the pin gage is provided with a step, there is a possibility that the pin gage itself loses its concentricity between the large-diameter portion and the small-diameter portion. Hence, there is a drawback in that the concentricity of the pin gage is reflected as it is on the concentricity of the main body portion of the motor and the output shaft, so that the concentricity varies.

In particular, with the motor for feeding an optical pickup in an optical disk drive apparatus, the span of the bent sides 10a and 10b of the frame 10 is 50 to 60 mm or thereabouts and is thus long. Therefore, if the frame 10 is inclined even slightly when it is fixed, the position for supporting the distal end of the output shaft becomes offset by a large degree, so that unless the hole diameter on the distal end side of the frame is measured directly to control concentricity, the accuracy of concentricity required for this type of motor cannot be ensured.

SUMMARY OF THE INVENTION

The invention has been devised in view of the above-described conventional art, and its object is to provide a motor which has a motor body and a frame for holding its output shaft, and which makes it possible to obtain concentricity of the motor body and the output shaft with high accuracy and minimize the clearance between the stator and the rotor, as well as a method of manufacturing the same.

(1) In accordance with the invention, there is provided a method of manufacturing a motor including a cylindrical rotor having a magnet, a stator having a cylindrical inner peripheral surface opposing to an outer periphery of the rotor, an output shaft of the rotor projecting from a first axial end side of the stator, and a frame fixed to the first axial end side of the stator to pivotally support the output shaft at a distal end thereof, the method comprising the steps of:

forming holes in the frame at a portion where the distal end of the output shaft is pivotally supported and at a portion where the stator is fixed, wherein the holes have diameters identical to a diameter of the inner peripheral surface of the stator;

simultaneously inserting a round rod-shaped positioning jig having a diameter slightly smaller than the diameter of the holes into a hole defining the inner peripheral surface of the stator and into the two holes in the frame, and causing the positioning jig to abut against the inner peripheral surfaces of the holes so as to effect positioning; and fixing a first side of the frame to the first axial end side of the stator.

(2) The method of manufacturing a motor according to (1), further comprising the steps of:

providing a bearing member having a slide bearing an outer wall of which is cylindrical and which pivotally supports the output shaft of the rotor on a side which opposite to a distal end thereof, the bearing member being adapted to hold the slide bearing so as to be axially movable on a second axial end side of the stator as the outer wall of the slide bearing is brought into sliding contact with an inner wall of the bearing member by using the inner wall as a guide;

forming the inner wall of the bearing member with a diameter identical to that of the inner peripheral surface of the stator;

simultaneously inserting the positioning jig into the hole defining the inner peripheral surface of the stator and the two holes in the frame, and causing the positioning jig to abut against the inner peripheral surfaces of the holes so as to effect positioning; and fixing the first side of the frame to the first axial end side of the stator, and fixing the bearing member to the second axial end side of the stator.

(3) In accordance with the invention, there is provided a motor comprising:

a cylindrical rotor having a magnet;

a stator having a cylindrical inner peripheral surface opposing to an outer periphery of the rotor;

an output shaft of the rotor projecting from a first axial end side of the stator; and a frame fixed to the first axial end side of the stator to pivotally support the output shaft at a distal end thereof, the frame being provided with holes at a portion where the distal end of the output shaft is pivotally supported and at a portion where the stator is fixed;

wherein the holes have a diameter identical to a diameter of the inner peripheral surface of the stator, and a central axis of the inner peripheral surface of the stator and central axes of the two holes in the frame are concentrically aligned.

(4) In accordance with the invention, The motor according to (3), further comprising:

a bearing member having a slide bearing an outer wall of which is cylindrical and which pivotally supports the output shaft of the rotor on a side thereof opposite to a distal end thereof, the bearing member being adapted to hold the slide bearing so as to be axially movable on a second axial end side of the stator as the outer wall of the slide bearing is brought into sliding contact with an inner wall of the bearing member by using the inner wall as a guide;

wherein the first side of the frame is fixed to the first axial end side of the stator, and the bearing member is fitted to the second axial end side of the stator, the inner wall of the bearing member is formed with a diameter identical to that of the inner peripheral surface of the stator, and respective central axes of the inner wall of the bearing member, the inner peripheral surface of the stator, and the two holes in the frame are concentrically aligned.

(5) In accordance with the invention, the motor according to (3), wherein a lead screw is formed on the output shaft, and as one of a portion of an optical pickup and a member substantially integrated with the optical pickup is engaged with the lead screw, the motor is formed for use in feeding the optical pickup.

DETAILED DESCRIPTION OF THE PREFERRED EMBODIMENTS

Figure 1:
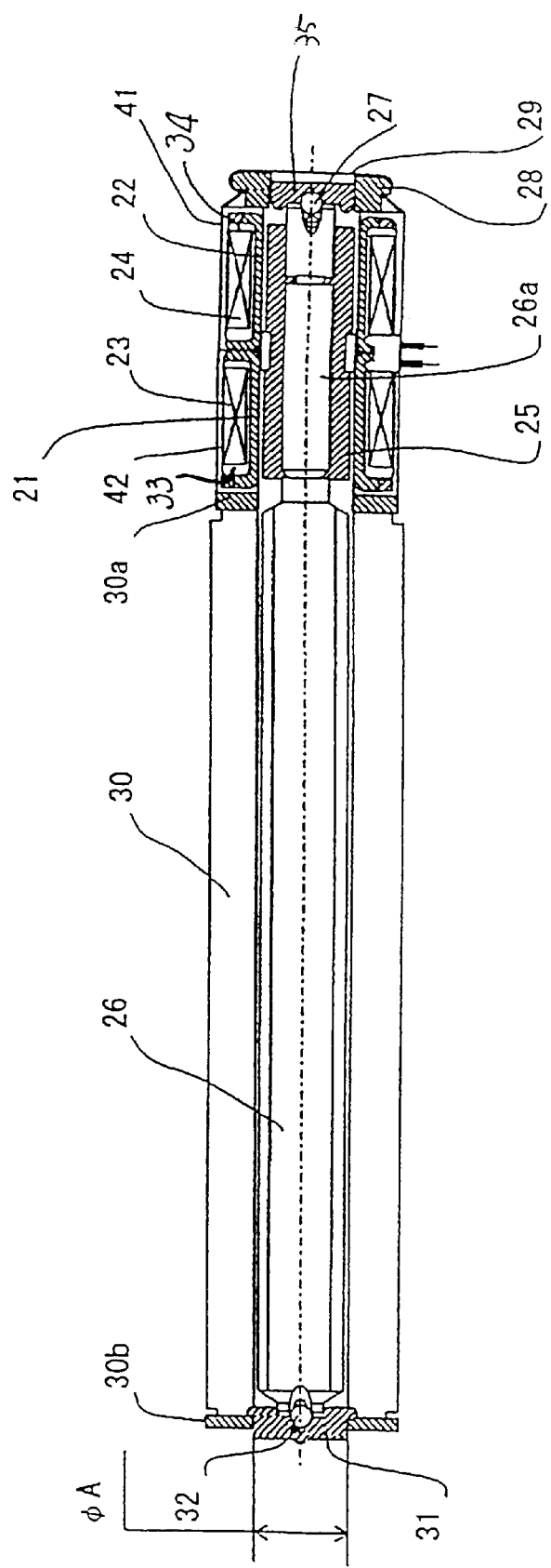
FIG. 1 is a vertical cross-sectional view illustrating an embodiment of a motor in accordance with the invention.

Referring now to the drawings, a description will be given of an embodiment of a motor and a method of manufacturing the same in accordance with the invention In FIGS. 1 and 2, a stator portion of the motor includes a stator set consisting of a stator core 21 and drive coils 23 each wound around a bobbin 33 circumscribing this stator core 21 as well as a stator set consisting of a stator core 22 and drive coils 24 each wound around a bobbin 34 circumscribing this stator core 22. These two stator sets are fixed by being superposed in the axial direction, and housings 41 and 42 are respectively fitted over outer peripheral sides of the stator sets from the respective outer end sides of the stator sets. This motor is a stepping motor, and each of the stator cores 21 and 22 has a plurality of pole teeth arranged at equal intervals in a cylindrical shape on its inner peripheral side. An outer side surface of a bent side 30a at one end side of a frame 30, which is formed in a U-shape with both end faces bent orthogonally in the same direction and with a long bottom, is fixed to an end face on an axially outer side of the stator core 21.

Figure 2:
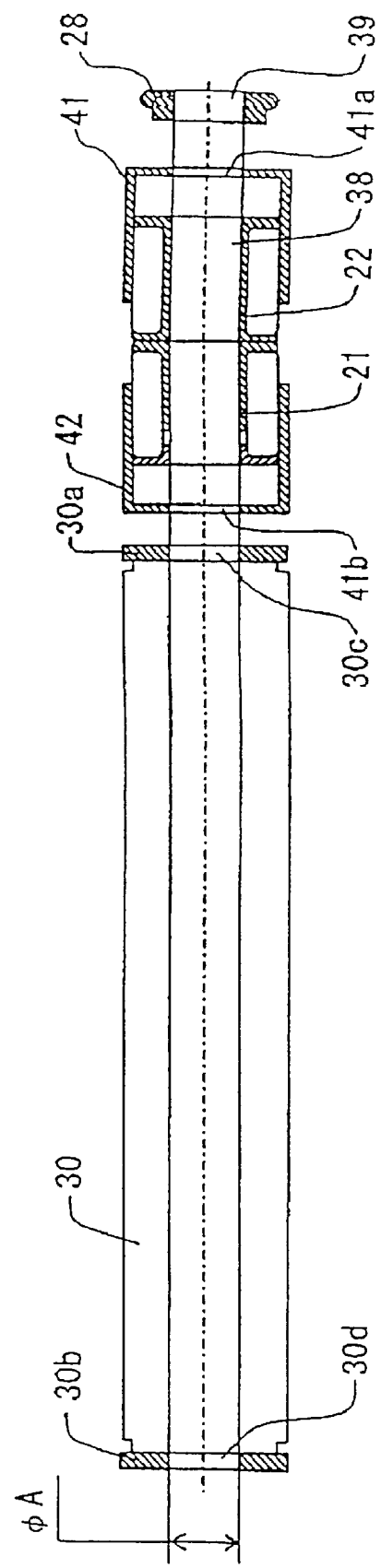
FIG. 2 is a vertical cross-sectional view illustrating, in a disassembled form, a stator and a frame portion in the above-described embodiment.
Figure 3:
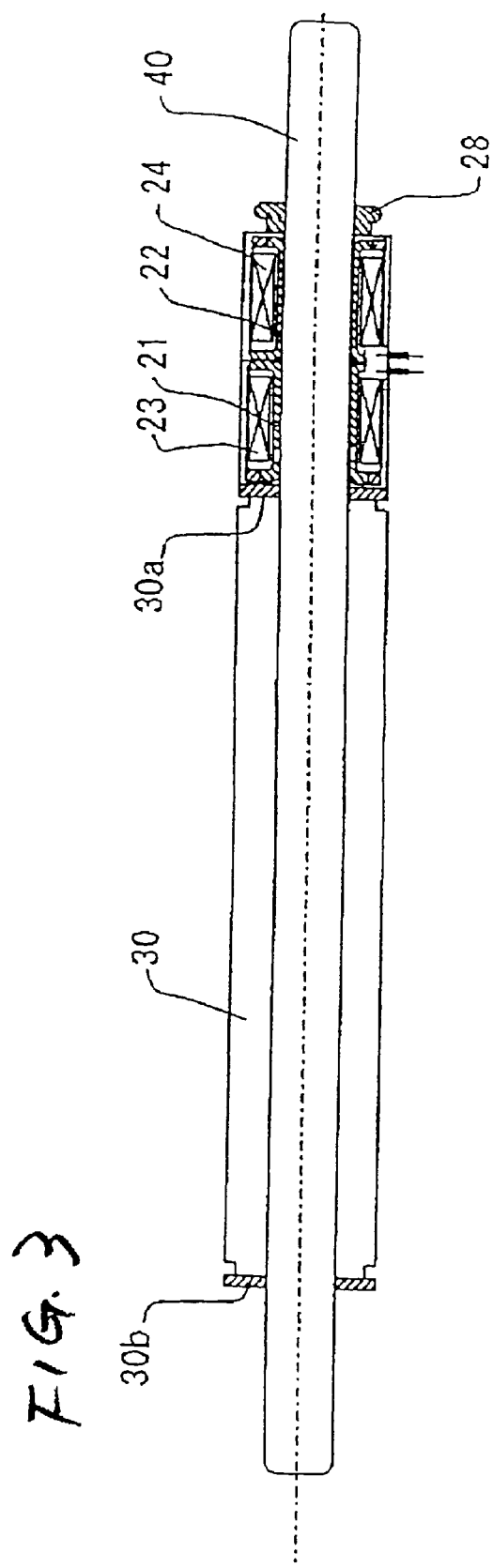
FIG. 3 is a vertical cross-sectional view illustrating an embodiment of a method of manufacturing the motor in accordance with the invention.
Figure 4:
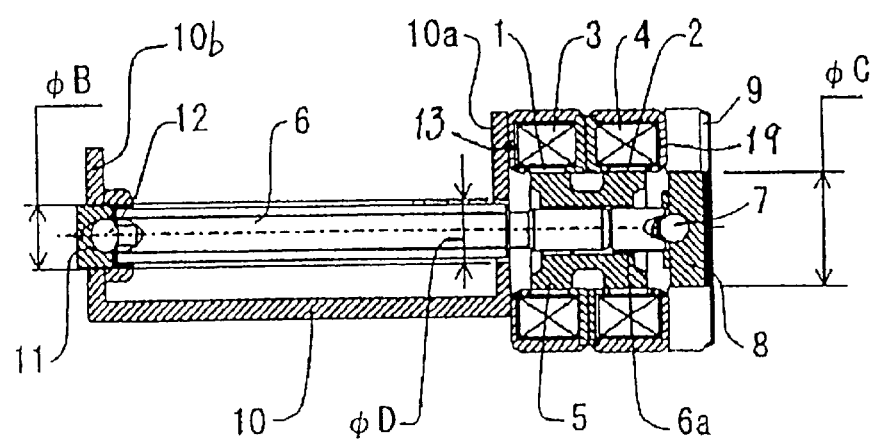
FIG. 4 is a vertical cross-sectional view illustrating an example of a conventional motor.

As shown in FIG. 2, a hole 30d with a diameter of $\phi A$ is formed in a bent side 30b at the other end side of the frame 30, and a bearing 31, which consists of a small-diameter portion having the same diameter as the aforementioned φA and a large-diameter portion larger than the same, has its small-diameter portion fitted and fixed in this hole 30d from the inner side of the frame 30. The bearing 31 has a recess for receiving one end portion of an output shaft 26, and has a semispherical recess for receiving an approximately half of a steel ball 32 in a bottom of this recess. A conical recess provided at a distal end of the output shaft 26 is fitted over the steel ball 32 fitted in the semispherical recess.

As shown in FIG. 2, the bent side 30a at the one end side of the frame 30 is also provided with a hole 30c with substantially the same diameter as the diameter φA of the aforementioned hole 30d, and the output shaft 26 is passed through this hole 30c. In addition, the housings 41 and 42 are also respectively provided with holes 41a and 41b of the same diameter as the aforementioned diameter φA, and the output shaft 26 is passed through these holes 41a and 41b as well. One end side of the output shaft 26 is formed as a small-diameter portion 26a, and this small-diameter portion 26a is inserted in holes defining inner peripheral sides of the stator cores 21 and 22.

The diameter of central holes 38 in the stator cores 21 and 22 is the same as the diameters φA of the holes 30c and 30d formed in the bent sides 30a and 30b of the frame 30. A slide bearing 35 whose outside diameter is substantially the same as the aforementioned inside diameter φA is fitted on an inner periphery of the stator core 22 having the inside diameter φA, such that the slide bearing 35 is slidable along the inner periphery of a cap 28 serving as a bearing member fixed to an end face of the stator core 22. Namely, the cap 28 has a central hole 39 with the inside diameter of φA, and an outer wall of the slide bearing 35 is slidably fitted in this central hole 39. The cap 28 is fixed to the housing 41, and urges the slide bearing 35 by a leaf spring 29 fixed to the cap 28.

The slide bearing 35 has a recess on its inner end side, and an approximately half portion of a steel ball 27 is thrust into this recess, while the remaining approximately half portion of the steel ball 27 is fitted in a conical recess formed in an end face of the small-diameter portion 26a which is the one end side of the output shaft 26. The slide bearing 35 is urged in a direction in which it enters an inner periphery of the stator core 22 by the aforementioned leaf spring 29. A hollow cylindrical magnet 25 is fitted and secured on an outer peripheral side of the small-diameter portion 26a of the output shaft 26, and the output shaft 26 and the magnet 25 constitute the rotor of the motor.

Magnetic poles are formed in the magnet 25 at equal intervals in the circumferential direction, and as the drive coils 23 and 24 are alternately energized by a power supply in the form of pulses, the rotor rotates through predetermined angles. A lead screw is formed on the output shaft 26 between the bent sides 30a and 30b of the frame 30, and as a portion of an object to be driven, such as an unillustrated optical pickup, or a member substantially integrated therewith, is engaged with this lead screw, the object to be driven is moved back and forth in the axial direction along the lead screw of the output shaft 26 in correspondence with the rotation of the output shaft 26.

As described above, and as shown in FIG. 2, the central hole 39 in the cap 28, the hole 41a in the housing 41, the central hole 38 in the stator, the hole 41b in the housing 42, and the holes 30c and 30d in the bent sides 30a and 30b of the frame 30 respectively have diameters φA of the same diameter. Accordingly, with the motor in accordance with the above-described embodiment, the relative positional relationship and concentricity of the respective members are obtained in a state in which a round rod-shaped positioning jig 40 whose outside diameter is slightly smaller than φA over its entire length is inserted in the respective holes, and the jig 40 is passed through the respective holes, i.e., in a state in which the positioning jig 40 is inserted in the respective holes and the inner peripheral surfaces of the holes abut against the positioning jig 40. In this state, the bent side 30a on the one end side of the frame 30 is fixed to the one axial end side of the stator, and the cap 28 is fixed to the other axial end side of the stator. Subsequently, the positioning jig 40 is drawn out.

If assembly is effected in this manner, the central hole 39 in the cap 28, the hole 41a in the housing 41, the central hole 38 in the stator, the hole 41b in the housing 42, and the holes 30c and 30d in the bent sides 30a and 30b of the frame 30 are positioned and fixed by the outer peripheral surfaces of the round rod-shaped positioning jig 40. Therefore, positioning is effected accurately in conformity with the outer peripheral surface of the positioning jig 40. Moreover, since the positioning jig 40 is shaped in the form of a round rod, the positioning jig 40 itself can be easily processed accurately and is free of the problem of concentricity. The concentricity of the holes in the respective members which are positioned in conformity with this positioning jig 40 is also excellent, thereby making it possible to obtain a motor in which the amounts of rotational runout, rotational irregularities, and the like are small and which exhibits high rotational accuracy. In addition, because the concentricity of the holes in the respective members is excellent, it is possible to reduce the clearance between the inner wall of the stator and the outer periphery of the rotor, thereby making it possible to obtain a high-precision high-performance motor.

It should be noted that the above-described positioning jig is sufficient if it is inserted simultaneously into the holes in contact with at least the inner wall of the central hole 39 in the cap 28, the inner peripheral surface of the central hole 38 in the stator, and the inner walls of the two holes 30c and 30d in the frame 30, and can position these members, and it is unnecessary for the holes 41a and 41b in the housings 41 and 42 to be positioned.

The application of the motor in accordance with the invention is not limited to feeding the optical pickup, and the motor in accordance with the invention is applicable to an arrangement in which the output shaft projecting from the main body of the motor is pivotally supported by the frame. For example, the motor in accordance with the invention is applicable to such as a capstan motor for a tape recorder. In addition, the type of motor is not limited to a stepping motor, and the motor in accordance with the invention is applicable to a dc or ac brushless motor, a motor with a brush, a coreless motor, and various other types of motors.

In accordance with the invention, the motor has a frame which is fixed to one axial end side of the stator to pivotally support the output shaft at a distal end thereof, and holes having diameters identical to the diameter of the inner peripheral surface of the stator are formed in this frame at a portion thereof for pivotally supporting the distal end of the output shaft and at a portion thereof for fixing the stator, respectively. Therefore, a round rod-shaped positioning jig of a diameter slightly smaller than those of the holes can be inserted simultaneously into a hole defining the inner peripheral surface of the stator and into the two holes in the frame, and the positioning jig can be caused to abut against the inner peripheral surfaces of the holes so as to effect positioning. One side of the frame can then be fixed to the one axial end side of the stator. Accordingly, the concentricity of the holes in the respective members which are positioned in conformity with the aforementioned positioning jig is also excellent, thereby making it possible to obtain a motor in which the amounts of rotational runout, rotational irregularities, and the like are small and which exhibits high rotational accuracy. In addition, because the concentricity of the holes in the respective members is excellent, it is possible to reduce the clearance between the inner wall of the stator and the outer periphery of the rotor, thereby making it possible to obtain a high-precision high-performance motor.

What is claimed is:

1. A method of manufacturing a motor including a cylindrical rotor having a magnet, a stator having a cylindrical inner peripheral surface opposing to an outer periphery of said rotor, an output shaft of said rotor projecting from a first axial end side of said stator, and a frame fixed to the first axial end side of said stator to pivotally support said output shaft at a distal end thereof, the method comprising the steps of:

forming holes in said frame at a portion where the distal end of said output shaft is pivotally supported and at a portion where said stator is fixed, wherein said holes have diameters identical to a diameter of the inner peripheral surface of said stator;

simultaneously inserting a round rod-shaped positioning jig having a diameter slightly smaller than the diameter of said holes into a hole defining the inner peripheral surface of said stator and into said two holes in said frame, and causing said positioning jig to abut against the inner peripheral surfaces of said holes so as to effect positioning; and fixing a first side of said frame to the first axial end side of said stator.

2. The method of manufacturing a motor according to claim 1, further comprising the steps of:

providing a bearing member having a slide bearing an outer wall of which is cylindrical and which pivotally supports said output shaft of said rotor on a side which opposite to a distal end thereof, said bearing member being adapted to hold said slide bearing so as to be axially movable on a second axial end side of said stator as the outer wall of said slide bearing is brought into sliding contact with an inner wall of said bearing member by using said inner wall as a guide;

forming the inner wall of said bearing member with a diameter identical to that of the inner peripheral surface of said stator;

simultaneously inserting said positioning jig into the hole defining the inner peripheral surface of said stator and said two holes in said frame, and causing said positioning jig to abut against the inner peripheral surfaces of said holes so as to effect positioning; and fixing the first side of said frame to the first axial end side of said stator, and fixing said bearing member to the second axial end side of said stator.

3. A motor comprising:

a cylindrical rotor having a magnet;

a stator having a cylindrical inner peripheral surface opposing to an outer periphery of said rotor;

an output shaft of said rotor projecting from a first axial end side of said stator; and a frame fixed to the first axial end side of said stator to pivotally support said output shaft at a distal end thereof, said frame being provided with holes at a portion where the distal end of said output shaft is pivotally supported and at a portion where said stator is fixed;

wherein said holes have a diameter identical to a diameter of the inner peripheral surface of said stator, and a central axis of the inner peripheral surface of said stator and central axes of said two holes in said frame are concentrically aligned.

4. The motor according to claim 3, further comprising:

a bearing member having a slide bearing an outer wall of which is cylindrical and which pivotally supports said output shaft of said rotor on a side thereof opposite to a distal end thereof, said bearing member being adapted to hold said slide bearing so as to be axially movable on a second axial end side of said stator as the outer wall of said slide bearing is brought into sliding contact with an inner wall of said bearing member by using said inner wall as a guide;

wherein the first side of said frame is fixed to the first axial end side of said stator, and said bearing member is fitted to the second axial end side of said stator, the inner wall of said bearing member is formed with a diameter identical to that of the inner peripheral surface of said stator, and respective central axes of the inner wall of said bearing member, the inner peripheral surface of said stator, and the two holes in said frame are concentrically aligned.

5. The motor according to claim 3, wherein a lead screw is formed on said output shaft, and as one of a portion of an optical pickup and a member substantially integrated with said optical pickup is engaged with said lead screw, said motor is formed for use in feeding said optical pickup.

* * * * *